US008790565B2

(12) United States Patent
Miller

(10) Patent No.: US 8,790,565 B2
(45) Date of Patent: Jul. 29, 2014

(54) COMPOSITE STRUCTURE

(75) Inventor: Jason Anthony Miller, Eltham (AU)

(73) Assignee: Futuris Automotive Interiors (Australia) Pty Ltd, Port Melbourne, Victoria (AU)

( * ) Notice: Subject to any disclaimer, the term of this patent is extended or adjusted under 35 U.S.C. 154(b) by 1104 days.

(21) Appl. No.: 12/279,880

(22) PCT Filed: Feb. 13, 2007

(86) PCT No.: PCT/AU2007/000152
§ 371 (c)(1),
(2), (4) Date: Aug. 19, 2008

(87) PCT Pub. No.: WO2007/095668
PCT Pub. Date: Aug. 30, 2007

(65) Prior Publication Data
US 2008/0318021 A1    Dec. 25, 2008

(30) Foreign Application Priority Data

Feb. 22, 2006    (AU) ................................ 2006900877

(51) Int. Cl.
*B29C 44/12*    (2006.01)
*B29C 70/00*    (2006.01)
*B29C 44/56*    (2006.01)
*B29C 70/54*    (2006.01)
*B29B 11/16*    (2006.01)
*B29C 70/24*    (2006.01)

(52) U.S. Cl.
CPC ............. *B29C 44/1209* (2013.01); *B29C 70/24* (2013.01); *B29C 44/5618* (2013.01); *B29B 11/16* (2013.01); *B29C 70/543* (2013.01)
USPC ......... 264/266; 264/46.4; 264/46.6; 264/257; 264/265; 264/267

(58) Field of Classification Search
CPC ...................................................... B29C 70/24
USPC ......... 264/257, 258, 259, 261, 263, 264, 266, 264/267, 46.4, 46.6, 265; 66/196; 442/315
See application file for complete search history.

(56) References Cited

U.S. PATENT DOCUMENTS 3,356,781 A * 12/1967 Hedin et al. .................. 264/137
4,686,134 A    8/1987 Ono
(Continued)

FOREIGN PATENT DOCUMENTS

GB    720687 A    12/1954
GB    1491080 A    11/1977
(Continued)

*Primary Examiner* — Atul P. Khare
(74) *Attorney, Agent, or Firm* — Richard M. Goldberg

(57) ABSTRACT

A composite structure, such as a structural member (12), is formed by the steps of knitting a three dimensional pre-form (17) from one or more selected fibers such as natural fibers selected from hemp, cotton, flax, jute and synthetic fibers such as boron aramide fibers, carbon fibers, glass fibers and polymer based fibers, using a three dimensional knitting machine (16). The pre-form (17) has a shape commensurate with that of the structure (12) to be formed. The pre-form (17) is caused to take its three dimensional shape by inflating or otherwise expanding the pre-form such as by injecting a foamable synthetic plastics material into the interior of the pre-form, and thereafter fixing the shape of the shaped fibers to form the composite structure.

17 Claims, 3 Drawing Sheets

(56) References Cited

U.S. PATENT DOCUMENTS

| | | | |
|---|---|---|---|
| 5,166,480 A | | 11/1992 | Bottger et al. |
| 5,173,227 A | * | 12/1992 | Ewen et al. .................. 264/46.6 |
| 5,647,503 A | * | 7/1997 | Steele et al. .................. 220/589 |
| 5,916,679 A | * | 6/1999 | Woodside et al. ............ 428/375 |
| 6,152,840 A | * | 11/2000 | Baum ........................... 473/564 |
| 6,370,921 B1 | * | 4/2002 | Winowich et al. ................ 66/10 |
| 2001/0011442 A1 | * | 8/2001 | Phin ............................. 52/309.1 |
| 2004/0142619 A1 | * | 7/2004 | Ueno et al. ..................... 442/306 |
| 2005/0077643 A1 | * | 4/2005 | Matsuoka ..................... 264/103 |

FOREIGN PATENT DOCUMENTS

| | | |
|---|---|---|
| JP | 2002113788 A | 4/2002 |
| JP | 2002361750 A | 12/2002 |

\* cited by examiner

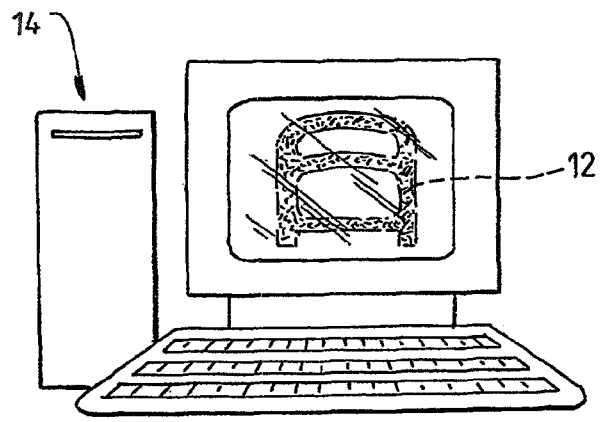
FIG. 1.
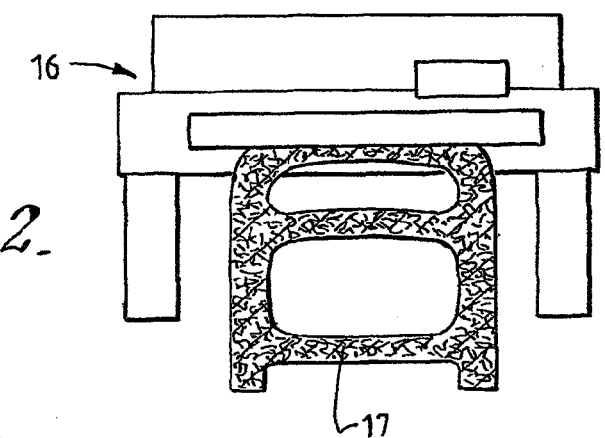
FIG. 2.
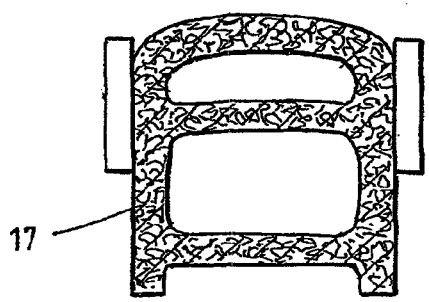
FIG. 3.
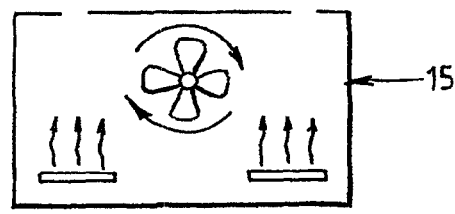

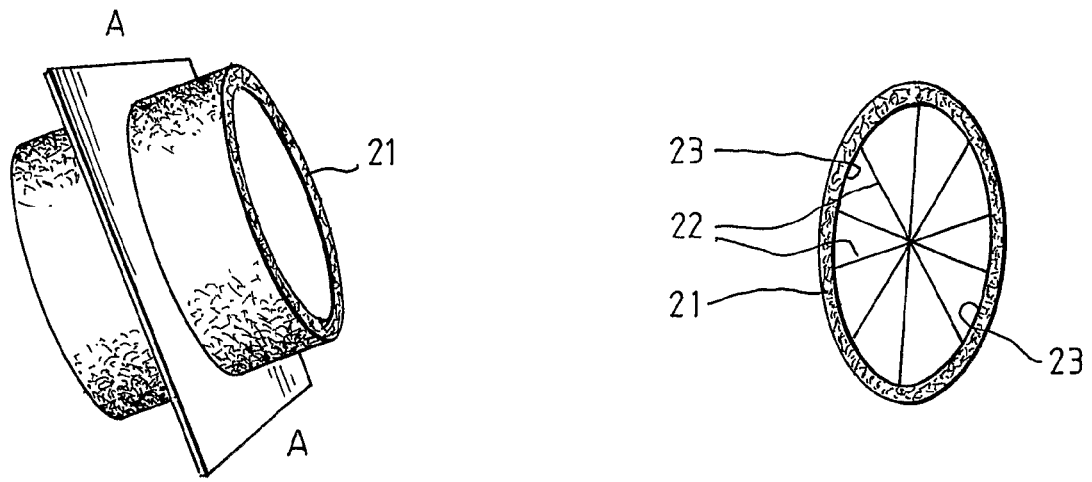
FIG. 6.
FIG. 7.
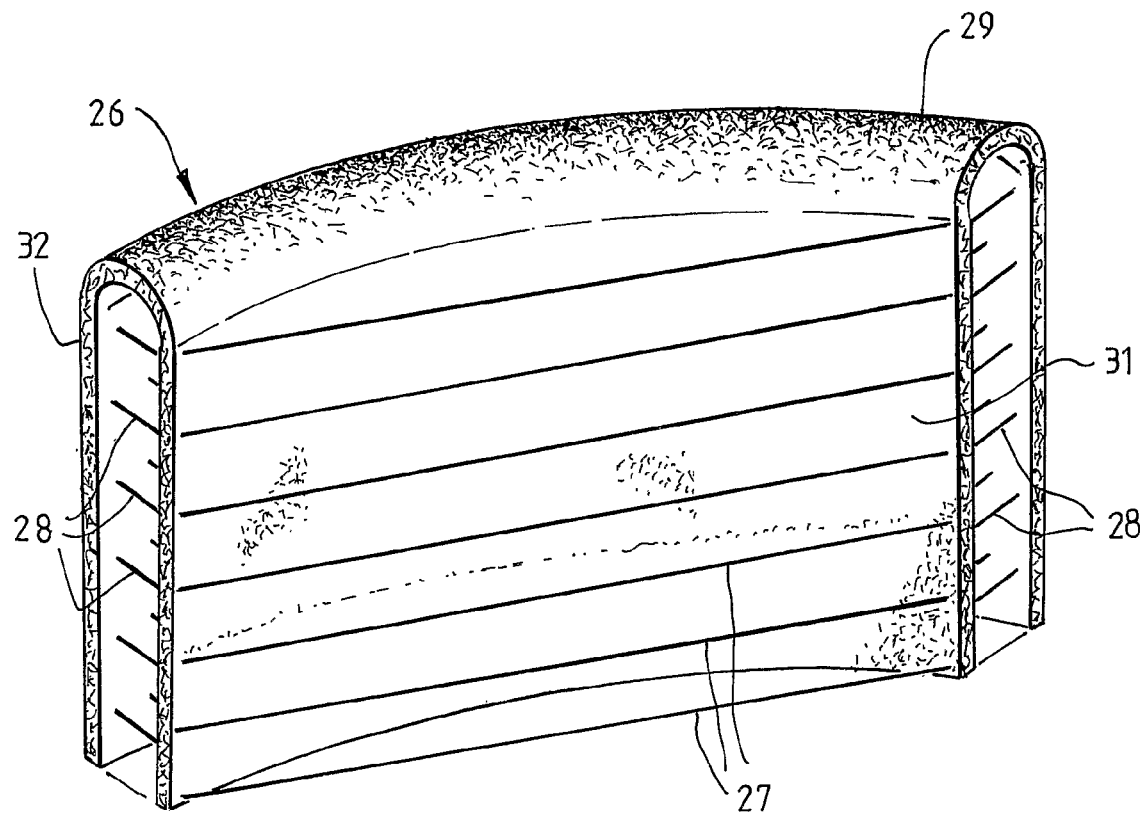
FIG. 8.

COMPOSITE STRUCTURE

FIELD OF THE INVENTION

This invention relates to composite structures and relates particularly to structures that can be formed of a variety of materials but for which composites provide improved properties and cost advantages.

The present invention will be described with particular reference to its application to the manufacture of a composite structure that may be utilised in the construction of automobile fixtures or fittings, or fixtures or fittings for other vehicles. It will be appreciated, however, that the invention has a wider application, and any description of specific application should not be considered limiting in any form. Thus, the invention has wide application in construction, industry, building, aircraft construction and many other areas.

BACKGROUND OF THE INVENTION

Composites come in many forms and may broadly be described as the marriage or intermixing of two or more different materials in order to exploit and use the properties of each. These properties may include relatively low weight, temperature resistance, wear resistance, high strength and stiffness, including sheer, tension, compression and torsional strength, and many other properties that may be useful for a particular application.

Composite materials are formed from a variety of natural and synthetic fibres, such as fibreglass, Kevlar (trade mark), phenolic epoxy, carbon, arimid, hemp, cotton and many others, as well as resins, synthetic plastics materials of all types, rubber and many other construction materials.

Many composite materials are presently commercially available including commonly applied random fibre, reinforced, injection moulded plastics, and thermal compression moulded reinforced plastics. These commonly available materials, however, generally require expensive tooling.

In the automotive industry, for example, many automobile parts are formed of pressed and formed sheet steel structures. For example, many seat structures are formed of sheet steel pressed and/or formed to the required shape and form for structural rigidity and function. To be able to match the properties of such pressed and/or formed steel structures it is necessary to utilise advanced composites such as those employed in the aircraft, aerospace, military and motor sports industries.

While the composites industries have developed rapidly in those areas unhindered by cost competitiveness, a different situation applies in the broader manufacturing industries where a fundamental difference occurs between cost and performance. The automotive industries, however, whilst embracing composites in many areas, particularly in the high end of the market, mainstream automotive industries are substantially limited by long production cycle times, high labour and tooling costs of most high end composites as against the compromised strength and performance qualities of the lower end, less costly products.

High end advanced composites such as carbon-carbon composites, commonly used in elite motor sport and aerospace applications, require costly pre-processing of material laminates employing directional weaves and pre-impregnation of binder resins. These materials have a limited shelf life and thus impose strict cost quality management processes to ensure the final product consistency and integrity. The manufacture of composite structures using these high end materials requires labour intensive lay-up processes to achieve the desired directional orientation of the fibres and optimised strength in complex geometries. This is seen to be the most limiting and time consuming attribute of the conventional advanced composites manufacturing process. Another limiting aspect for structural parts is the requirement for costly mould tooling and large expensive autoclave ovens to cure the binder materials.

Many attempts have been made to reduce or eliminate the lay-up process of directionally controlled fibre reinforced composites. Most of these attempts have resulted in a compromise on the directionality of the fibres and hence a compromise in the performance of the product. Some of the more successful attempts have employed modular subassembly components that may be of uniform geometry and thus are more open to mass production methods. These subassembly components, however, still require extensive labour for final assembly and compromise the design flexibility with limitations on the final geometry.

Accordingly, there is a need to provide improved composite structures, and methods for their manufacture, which will facilitate the use of composites in a broad range of applications, particularly air craft manufacture, automobile manufacture and many other applications.

It is also desirable to provide composite structures that are consistently uniform.

It is also desirable to provide composite structures that require minimum labour in manufacture, assembly and production.

It is also desirable to provide composite structures which are relatively rigid and robust in use.

It is also desirable to provide composite structures which are relatively simple and economical to produce.

It is also desirable to provide composite structures that are able to be formed with the necessary structural strength, and with other properties required for their application.

It is also desirable to provide a method of forming composite structures which is able to be adapted to produce structures of a wide variety of shapes.

It is also desirable to provide methods of producing composite structures which utilise the various properties of fibres to be incorporated into the structure.

SUMMARY OF THE INVENTION

In accordance with one aspect of the invention there is provided a method of forming a composite structure comprising the steps of:

knitting a three dimensional pre-form using a three dimensional knitting machine, the pre-form having a shape commensurate with that of the structure to be formed, and the pre-form being knitted using one or more selected fibres, causing the knitted pre-form to take the three dimensional shape, fixing the shape, and subsequently using the fixed shape to define the composite structure.

Preferably, the shape is fixed by impregnating or coating the fibres with a curable resin and subsequently curing the resin, or by curing or otherwise setting synthetic fibres to form the composite three dimensional pre-form.

According to another aspect of the invention there is provided a composite three dimensional pre-form formed by the method described above.

The invention also includes a knitted three dimensional pre-form formed by knitting composite fibres, which may be natural fibres or synthetic fibres into a knitted structure which, when inflated or otherwise caused to take its three dimensional shape, takes the shape of a composite structure to be formed.

Preferred embodiments of the invention utilise three dimensional knitting technology which enables pre-forms of complex shapes to be knitted from natural and/or synthetic fibres, such as those to which reference is made above.

The preferred embodiments are designed such that the knitted structure forms, in its three dimensional shape, a composite space frame having the shape of the composite structure to be formed. In the knitted product, the fibres are aligned and arranged to utilise the unique properties of the selected fibres used. Thus, fibres may be incorporated into the knitted product to provide strength in one or more directions and/or to provide stiffness in certain areas. Fibres may also be included in the knitted product which, when heated or subjected to microwaves or other forms of energy cure or set so as to retain the three dimensional shape of the knitted product.

In some preferred embodiments, the knitted product is caused to take its three dimensional shape by injecting a foam, such as a polyurethane, polypropylene, polystyrene, or any other suitable synthetic plastics foam material. The foam expands within the knitted product and causes the knitted fibres to take their knitted three dimensional shape.

In other embodiments, the pre-form is caused to take its three dimensional shape by inflating the pre-form using a gas, such as air, or another fluid.

In some preferred embodiments, the knitted product, expanded by foam injection or by inflation, is sprayed or coated with, or dipped or immersed in a resin binder, such as a polyester or vinyl ester resin or any other suitable binder material.

In another form of the invention, one or more of the fibres forming the three dimensional knitted product (pre-form) is formed of a material able to be used in the knitted product but curable by application of UV light, heat, microwaves or other energy, to cure or harden and bind with other fibres to form the three dimensional composite structure.

In preferred embodiments of the invention, fibre orientation within the pre-form is controlled by the design of the knit with particular attention to controlling the fibre gauge, direction, density and interface. In areas of high stress or high load bearing regions of the formed structure, the knitted pre-form will have a pattern and thickness, and be formed of fibres appropriate to resist the stresses and loads. The design of the knitted pre-form will be tailored to ensure accurate and repeatable control of the overall shape of the formed structure when the pre-form is inflated or injected with foam. Adjustment of the geometry of the pre-form will be possible during the injection or inflation stage by inflating the pre-form within flexible jigs or fixtures defining the external shape of the composite structure. If the pre-form is inflated by injection with foam, the outer shape of the composite structure to be formed is determined by the jigs or fixtures supporting the pre-form during curing of the foam.

In one preferred form of the invention, resin coated fibres are introduced during the knitting stage, the fibres being coalesced with the application of heat. In another preferred embodiment, a resin matrix binder material is sprayed on the inflated pre-form and allowed to cure or caused to be cured by application of UV light, heat or other energy.

In a further preferred embodiment, the shaped, inflated pre-form is dipped or submerged into a solution of binder resin. Curing of the binder resin may be done by applying UV light, heat or, in the case of a two part epoxy, by applying the reactive agent. Alternatively, the resin may be simply allowed to cool to a set point whereby a chemical reaction results in curing.

A particular advantage of the composite structure in accordance with embodiments of the invention is the design flexibility and the possible geometries which are achievable. In addition, the embodiments of the invention may be formed with a large number of different materials both in terms of the fibres used to form the knitted pre-form and in terms of the binder.

In order that the invention is more readily understood, embodiments thereof will now be described with reference to the accompanying drawings.

DESCRIPTION OF THE DRAWINGS

FIG. 1 illustrates a computer designed knitted pre-form product design;

FIG. 2 schematically illustrates the formation of the knitted pre-form using a three dimensional knitting machine;

FIG. 3 schematically illustrates pre-form inflation;

FIG. 6 is an enlarged view of part of a tubular structure formed in accordance with the invention;

FIG. 7 is a cross-sectional view of the structure of FIG. 6; and

FIG. 8 illustrates the manufacture of a complex shaped composite structure.

DESCRIPTION OF THE PREFERRED EMBODIMENTS

Referring to FIGS. 1 to 5 of the drawings, an embodiment of the invention is illustrated in which a seat frame structure 12 is fabricated. For this purpose, a computer-aided design (CAD) system 14 is utilised to produce the necessary design parameters and software to be used in a three dimensional knitting machine 16. The design of the pre-form 17 to be knitted is optimised in the CAD design in terms of knit structure, fibre properties, stress and load bearing regions of the formed structure 12. The design also optimises fibre gauge, direction and density and other parameters that are required to ensure that the knitted pre-form 17, when produced, has the required three dimensional shape (when inflated) to form the seat frame structure 12.

Three dimensional knitting machines are known and are known to be able to be controlled by computer programs to produce a seamless, three dimensional knitted product of complex shape utilising fibers of choice. In the particular embodiment illustrated, the pre-form 17 is knitted using a selection of fibers selected from, for example, natural fibers such as hemp, cotton, flax, jute and synthetic fibers such as boron fibers, aramide fibers, carbon fibers, glass fibers, polymer based fibers and the like. By varying the fibers used, the formation of the knit, the knit density and fibre direction, a plurality of structural features are able to be incorporated into the knitted pre-form 17 which, in the end product, results in a seat frame structure 12 having the necessary strength, stress and load bearing capacities in the required areas thereof.

Although the knitted pre-form may be knitted in a seamless single piece, in different embodiments of the invention, a number of separate, knitted pre-forms may be assembled together, such as in a jig or fixture, to produce a composite structure.

The knitted pre-form 17, as shown in FIG. 2, is inflated or caused to take its three dimensional shape by inflating with a gas such as air, as shown in FIG. 3. In an alternate embodiment, the pre-form 17 is injected with a foamable synthetic plastics material which is expandable within the interior space of the pre-form 17 to cause the pre-form to take up its knitted three dimensional shape. In this embodiment, the foam interior of the pre-form remains to form part of the formed composite seat frame structure 12.

Where a gas such as air is used to inflate the pre-form 17, the finished seat frame structure 12 is hollow and is able to receive electrical cables or act as conduit in addition to its function as a seat frame.

Figure 4:
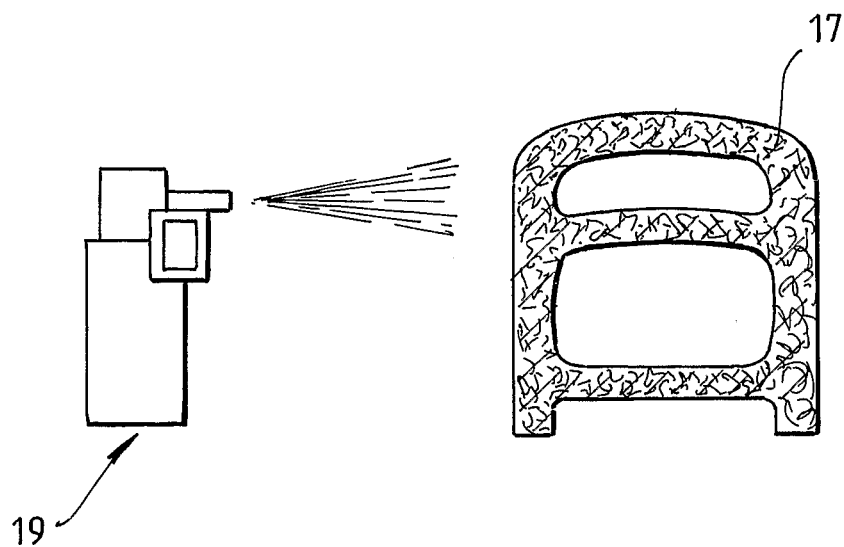
FIG. 4 schematically illustrates binder application.
Figure 5:
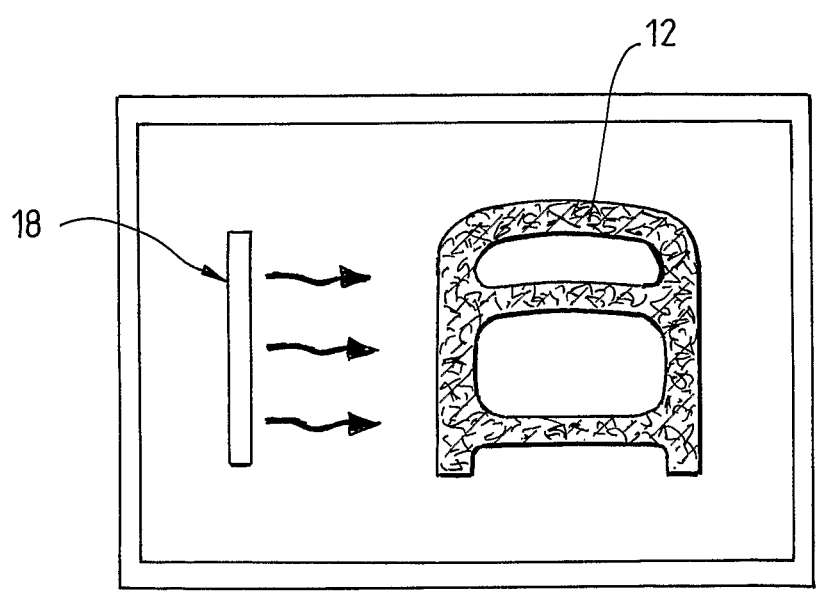
FIG. 5 schematically illustrates binder curing.

The inflated, or injected, pre-form 17 is then subjected to an infusion of a binder material which coats and permeates throughout the fabric of the knitted pre-form to wet and coat all the fibres. The infusion may be carried out by spraying the inflated, or injected, knitted pre-form 17 with a resin matrix binder material, as schematically illustrated in FIG. 4. Alternatively, the pre-form 17 may be immersed within a bath of binder material, such as a resin matrix, so that the binder material impregnates throughout the knitted fabric of the pre-form 17. The immersion or impregnation may take place either before inflation or after the pre-form has been inflated to its three dimensional shape. Once impregnated, the coated and inflated pre-form 17 is cured, as shown in FIG. 5, by application of ultraviolet light, heat or in the case of a two part epoxy binder material, by applying the reactive agent. Alternatively, the resin binder material may simply be allowed to cool to a set point which allows a chemical reaction to take place resulting in curing of the binder.

In a further embodiment, some of the fibres used in the knitted pre-form 17 may include resin coated fibres which integrate with other fibres of the pre-form and are curable to form the composite seat frame structure 12.

The particular binders used for particular embodiments will depend on the nature of the fibre and fibre combinations within the knitted pre-form fabric. Both synthetic and naturally occurring binder materials may be used in embodiments of the invention, the particular selection of binder being appropriate for the purpose for which the structure is constructed.

Referring to FIG. 6, a composite structure may include one or more hollow, tubular members having an external shape of a particular form. The tubular member 21 shown in FIG. 6 has an elliptical shape, as shown in FIG. 7. In order to produce this elliptical shape, the knitted pre-form 17 includes a plurality of tethers or shape defining fibres (threads) 22 which extend between opposed wall portions 23 of the tubular member 21 to hold the member 21 to the desired shape when inflated. Without the provision of such tethers 22, the tubular member 21 would take up a substantially circular cross sectional shape.

By using internal and external tethers, relatively complex shapes are able to be knitted by the three dimensional knitting machine which incorporates the tethers as part of the knitting process.

Referring to FIG. 8, a complex structure 26 is formed in accordance with an embodiment of the invention. The structure 26 incorporates a broad, three dimensional surface with constrained geometry using external tethers 27 as well as internal tethers 28 in the core of the section.

In the fabrication of the structure 26, a pre-form 29 is produced by the three dimensional knitting machine 16, the pre-form 29 having in its inflated form, front and rear surfaces 31 and 32 which are spaced apart and retained at the predetermined spacing by the internal tethers 28. The front and rear walls 31 and 32 are also curved, as shown, and are maintained in the curved shape by the external tethers 27. When the space between the front and rear walls 31 and 32 is injected with foam, and/or when the front and rear walls 31 and 32 are impregnated or sprayed with a resin matrix/binder material, which is subsequently cured, the external tethers 27 may be removed from the formed structure 26.

It will be appreciated that structures of complex shapes within the capacity of three dimensional knitting machines may be formed in accordance with the present invention thereby avoiding the need for complex moulds and time consuming, labour intensive fibre lay-ups and resin impregnation. The methods and structure of the embodiments illustrated facilitates repeatable, mass produced, composite structure production. Where a compressive resistance may be required across a formed section, the material used for inflating the pre-form fabric, such as a foamable synthetic plastics material, may be selected to provide compressive resistance in the formed structure. The particular methods of inflating or injecting the pre-form to enable it to take its shape, together with design innovation of the construction, direction and tension of the knit to constrain the pre-form in a desired geometry, and the methods of supporting the structure for curing without the need for tooling, enhance the utility of the invention and its embodiments.

Resin impregnation, infiltration and curing methods may be varied to reduce production cycle times further enhancing the use of the invention in mass production.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of forming a composite structure having a range of higher to lower load-bearing regions within its three-dimensional geometry, the method comprising the steps of:
    using a three-dimensional knitting machine to knit fibers into a seamless three-dimensional preform having walls closing around at least one interior space, the preform having a shape commensurate with that of said composite structure, and the preform being knit with a tailored fiber gauge, orientation, density, and interface resulting in said higher to lower load-bearing regions which in turn provide resistance to loads and stresses applied to the composite structure;
    providing into said interior space a foam material and then expanding the preform shape into said three-dimensional geometry using the foam material; and
    fixing the three-dimensional geometry by infusing resin binder throughout the expanded preform and then curing or setting the infused resin binder.

2. The method according to claim 1, wherein the fibers comprise natural and/or synthetic fibers.

3. The method according to claim 1, wherein the fibers are selected from the group consisting of hemp, cotton, flax, jute, synthetic, boron aramide, carbon, glass, and polymer-based fibers.

4. The method according to claim 1, wherein the fibers are aligned and arranged to utilize unique properties thereof so as to provide strength in one of more directions and/or stiffness in certain areas.

5. The method according to claim 1, wherein the fibers include fibers which are subsequently cured or set by subjecting to heat, microwaves, or other forms of energy so as to retain said preform shape.

6. The method according to claim 1, wherein the fibers include fibers which are coated with resin and subsequently coalesced by subjecting to heat.

7. The method according to claim 1, wherein the foam material is selected from the group consisting of polyurethane, polypropylene, and polystyrene.

8. The method according to claim 1, wherein the resin binder coats and permeates throughout the preform so as to wet and coat all of the fibers.

9. The method according to claim 1, wherein the resin binder is infused by spraying.

10. The method according to claim 1, wherein the resin binder is infused by dipping.

11. The method according to claim 1, wherein the resin binder is one of a polyester and a vinyl ester resin.

12. The method according to claim 1, wherein the resin binder is cured by applying UV light, heat, or a reactive agent or is set by allowing the resin binder to cool.

13. The method according to claim 1, wherein said knitting provides the preform with internal tethers, external tethers, and/or shape-defining fibers extending between wall portions of the preform.

14. The method according to claim 1, further comprising controlling said knitting machine using a computer-aided design system optimizing in terms of knit structure, fiber properties, and stress- and load-bearing regions of the composite structure.

15. The method according to claim 1, wherein for said expanding, the preform is positioned within a jig or fixture defining the three-dimensional geometry of the composite structure.

16. The method according to claim 1, further comprising knitting multiple of said preforms and then assembling the multiple preforms together in a jig or fixture.

17. The method according to claim 1, wherein the composite structure is a seat frame.

* * * * *